(12) United States Patent
Kanagaraj

(10) Patent No.: US 9,062,991 B2
(45) Date of Patent: Jun. 23, 2015

(54) DIAL LOCKING SYSTEM USING SNAP FIT AND A METHOD THEREOF

(75) Inventor: Rangappan Kanagaraj, Chennai (IN)

(73) Assignee: PRICOL LIMITED, Tamil Nadu (IN)

( * ) Notice: Subject to any disclaimer, the term of this patent is extended or adjusted under 35 U.S.C. 154(b) by 0 days.

(21) Appl. No.: 12/727,199

(22) Filed: Mar. 18, 2010

(65) Prior Publication Data

US 2010/0183368 A1 Jul. 22, 2010

Related U.S. Application Data

(63) Continuation of application No. PCT/IN2007/000428, filed on Sep. 24, 2007.

(51) Int. Cl.
*F16B 21/02* (2006.01)
*G01D 11/28* (2006.01)

(52) U.S. Cl.
CPC ............ *G01D 11/28* (2013.01); *B60K 2350/94* (2013.01)

(58) Field of Classification Search
CPC .................................................... G01D 11/305
USPC ................ 403/84–107, 348–350, 353, 359.3, 403/359.4; 411/349, 549, 553; 180/90; 296/70, 72; 248/27.1, 27.3; 74/431; 361/600; 359/819, 828; 116/62.1
See application file for complete search history.

(56) References Cited

U.S. PATENT DOCUMENTS

| 1,311,145 | A | * | 7/1919 | Seindler | 285/27 |
| 1,787,684 | A | * | 1/1931 | Jacobi | 180/90 |
| 2,151,089 | A | * | 3/1939 | Douglas | 439/546 |
| 2,272,688 | A | * | 2/1942 | Catron | 248/27.1 |
| 2,745,275 | A | * | 5/1956 | Jacobi | 248/27.1 |
| 3,287,980 | A | * | 11/1966 | Gilliland | 73/493 |
| 4,227,760 | A | * | 10/1980 | Witek, Jr. | 439/101 |
| 4,253,486 | A | * | 3/1981 | Hardin | 137/343 |
| 6,144,548 | A | * | 11/2000 | Kerchaert | 361/659 |
| 6,300,563 | B1 | * | 10/2001 | Kerchaert | 174/50 |
| 6,325,667 | B2 | * | 12/2001 | Sawayanagi | 439/537 |
| 6,710,526 | B1 | * | 3/2004 | Helbig | 362/640 |
| 7,357,669 | B2 | * | 4/2008 | Gabet | 439/549 |
| 2010/0140419 | A1 | * | 6/2010 | Brandt et al. | 248/27.1 |

FOREIGN PATENT DOCUMENTS

DE 4314190 A1 1/1994
DE 19737787 A1 3/1999

* cited by examiner

*Primary Examiner* — Victor Macarthur
(74) *Attorney, Agent, or Firm* — Perkins Coie LLP

(57) ABSTRACT

The present invention relates to a dial locking system. More particularly related to, the dial (100) having dial pinches (101, 102) at center and dial locking profile (106) at periphery. The compartment (200) has a central axis (7) with slots (201, 202) and resting profile (205) to accommodate the dial locking profile (106) for locking at periphery. The bulged profiles (203, 204) at the slots (201, 202) of the compartment (200) faced downwards for locking at center by the dial pinches (101,102). The time required to assemble the dial (100) with compartment (200) is reduced which in turn increases the production rate.

3 Claims, 9 Drawing Sheets

DIAL LOCKING SYSTEM USING SNAP FIT AND A METHOD THEREOF

CROSS REFERENCE TO RELATED APPLICATION

Figure 1A:
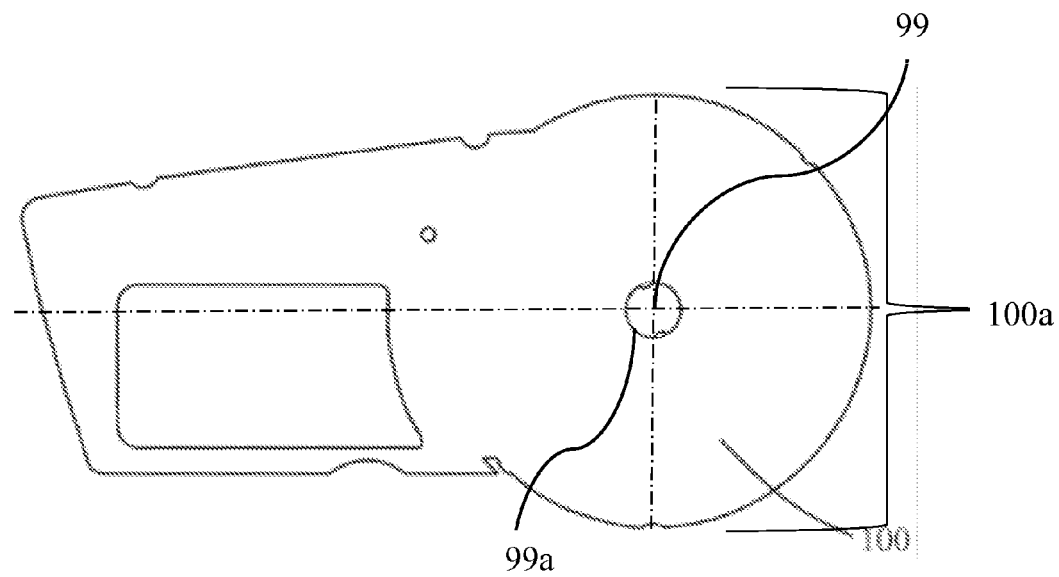

This application is a continuation of and incorporates by reference PCT/IN2007/000428 filed Sep. 24, 2007.

FIELD OF THE INVENTION

The present invention relates to a dial locking system. More particularly, the dial (100) is locked with the compartment (200) using snap fit at central axis (7) and on circumference of the dial (100). The time required to assemble the dial (100) with compartment (200) is reduced which in turn increases the production rate.

BACKGROUND OF THE INVENTION AND PRIOR ART

In the existing dial locking system the assembly of the dial (100) with the compartment (200) were carried out by screws (3) which increases the time of assembly and reduces the production rate. Whereas in the case of instant invention the use of snap fit in assembly of dial (100) with the compartment (200) reduces the time required to assembly and also increases the production rate.

The Compartment are mainly used in the instrument cluster for both holding the dial and guide the light from the LED (where mounted in the top side of the PCB (6)) to Bottom surface of the dial (where the numerals values are printed to indicate the speed or Engine RPM of the Vehicle).

Both Dial and the Compartment coming under the PCB (6) assy. Initially Compartment assembled with PCB (6) by using the snap fit at two places. After few electronic components assembly, the dial will be assembled by using the screw (3) (The No. of Screws (3) using for the dial assembly only based on the size of the dial and the compartment)

The dial locking system contains the following components, which locks the dial.
1. Compartment (or) light guide
2. Dial
3. CRPH self tap Screw (3)

The assembly sequence is as given below:
1. The Light Guide (or) Compartment (200) is assembled with the PCB (6) by using snap fit 2.
2. Assembling of LCD (4) (After diffuser sheet (5) placement) through the compartment (or) Light Guide by soldering with PCB (6).
3. Placing of dial on the compartment (or) Light Guide by using CRPH Self tap screw (3).

OBJECTS OF THE INVENTION

The principal object of the present invention is to develop a dial locking system wherein the dial (100) locks with compartment (200) using a snap fit at central axis (7) and on circumference of the dial (100).

Another object of the present invention is to develop the central axis (7) of the compartment comprising slots (201, 202) to position dial pinches (101,102) of the dial in unlocked stage.

Yet another object of the invention is to develop the slots (201,202) of compartment (200) which has semicircular bulged profiles (203,204) facing downwards.

Still another object of the invention is to provide a rotation to the dial (100) about the central axis (7) in counter clockwise direction such that the dial pinches (101,102) over rides the profile (203, 204) and resting profile (205) rests in dial locking profile (106) of the dial (100) to lock with the compartment.

Still another object of the invention is to develop a method of assembling a dial locking system.

Still another object of the invention is to provide the mounting for light guide/compartment (200) with PCB (6) by using snap fit.

STATEMENT OF THE INVENTION

Accordingly the invention provides a dial locking system comprising a dial (100) having dial pinches (101, 102) at center and dial locking profile (106) at periphery; a compartment (200) having a central axis (7) with slots (201, 202) and resting profile (205) to accommodate the dial locking profile (106) for locking at periphery; and bulged profiles (203, 204) at the slots (201, 202) of the compartment (200) facing downwards for locking at center by the dial pinches (101,102); a method for locking a dial (100) with a compartment (200), said method comprising steps of: placing the dial (100) on the compartment (200) such that the dial pinches (101,102) are in align with the slots (201,202) of the compartment (200), and rotating the dial (100) about the central axis (7) in counter clockwise direction such that the dial pinches (101,102) over rides the profile (203, 204) and resting profile (205) rests in dial locking profile (106) of the dial (100) to lock with the compartment (200); a method of assembling a dial locking system, said method comprising steps of: mounting light guide/compartment (200) with PCB (6) by using snap fit; assembling of LCD (4) through the compartment (200) by soldering with the PCB (6); placing of dial (100) on the compartment (200) and matching dial pinches (101,102) with slots (201,202) provided in the compartment (200); and rotating the dial (100) about the central axis (7) in counter clockwise direction such that the dial pinches (101,102) over rides the profile (203, 204) and resting profile (205) rests in dial locking profile (106) of the dial (100) to lock with the compartment (200).

BRIEF DESCRIPTION OF ACCOMPANYING DRAWINGS

Figure 1B:
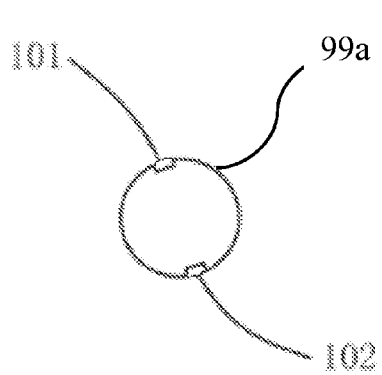
Figure 1C:
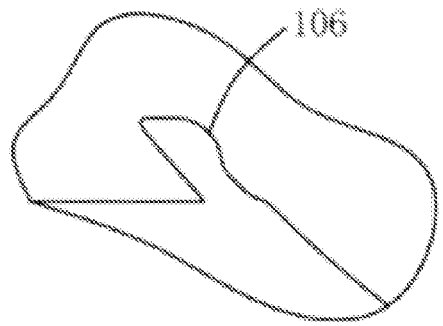
Figure 2A:
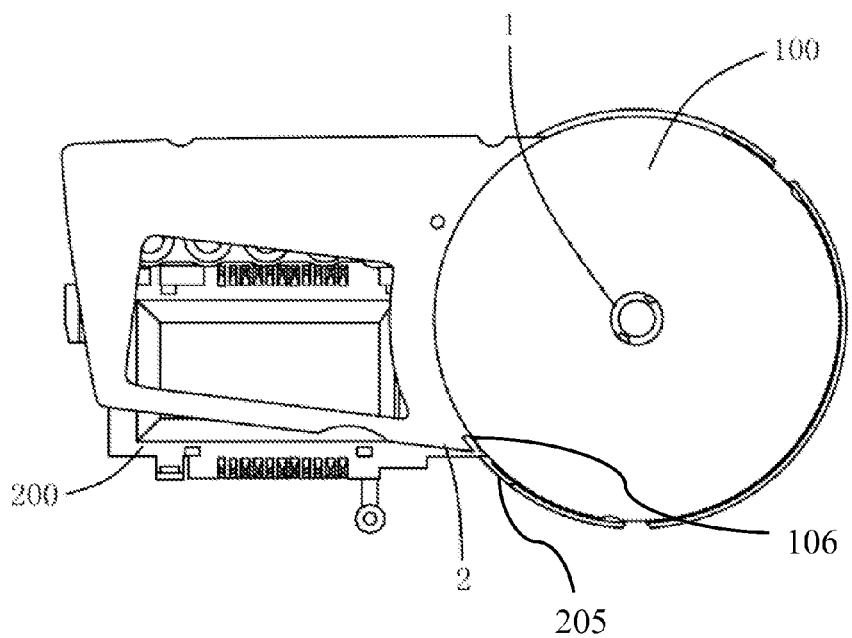
Figure 2B:
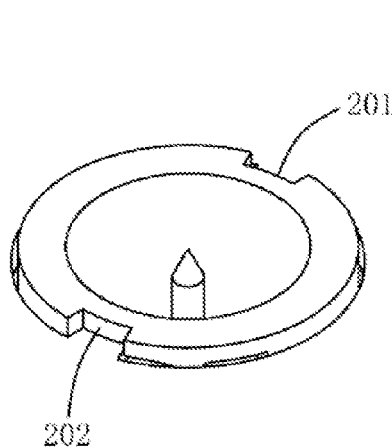
Figure 2C:
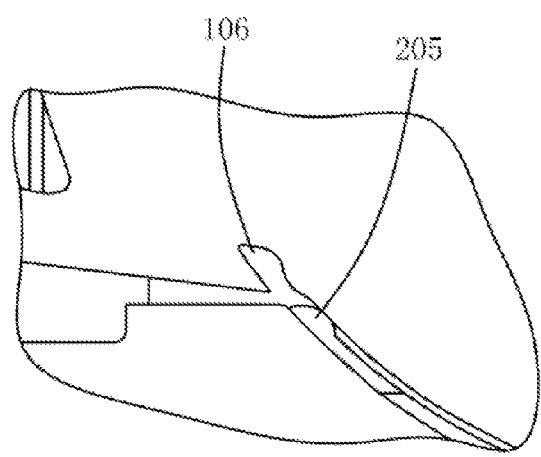
Figure 3A:
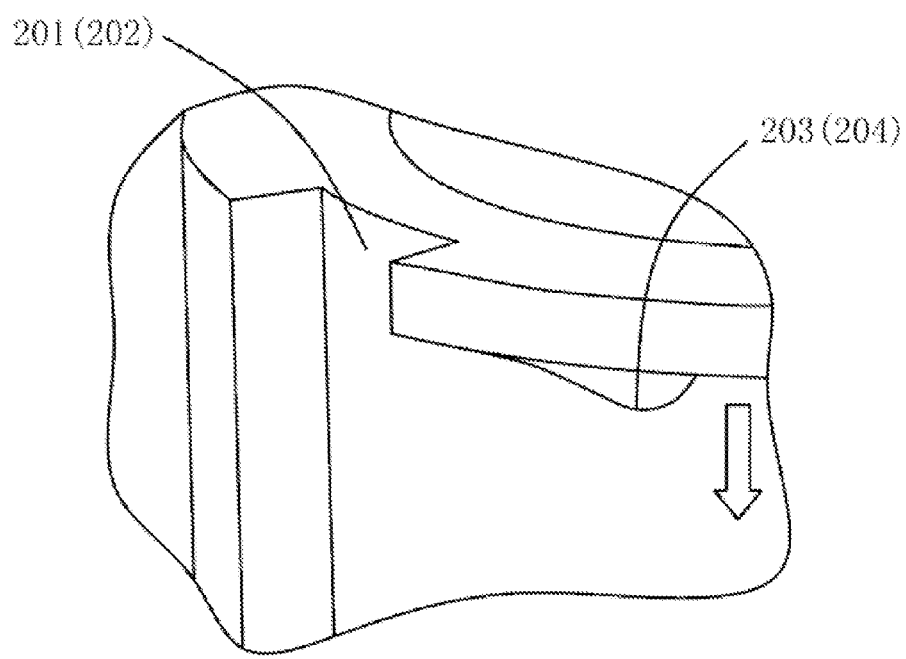
Figure 3B:
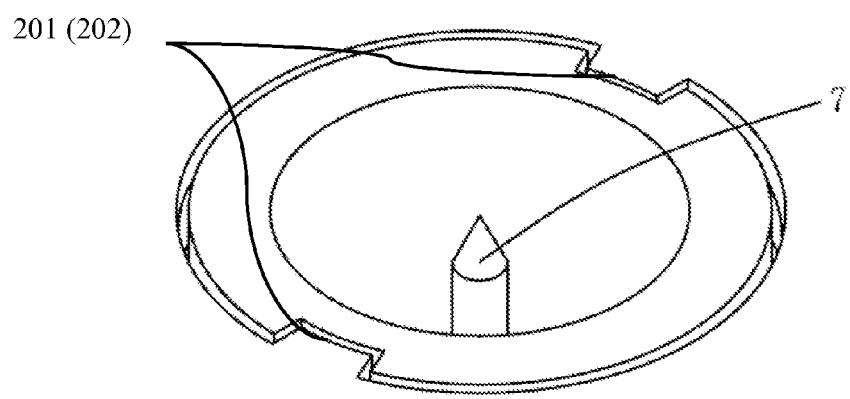
Figure 4A:
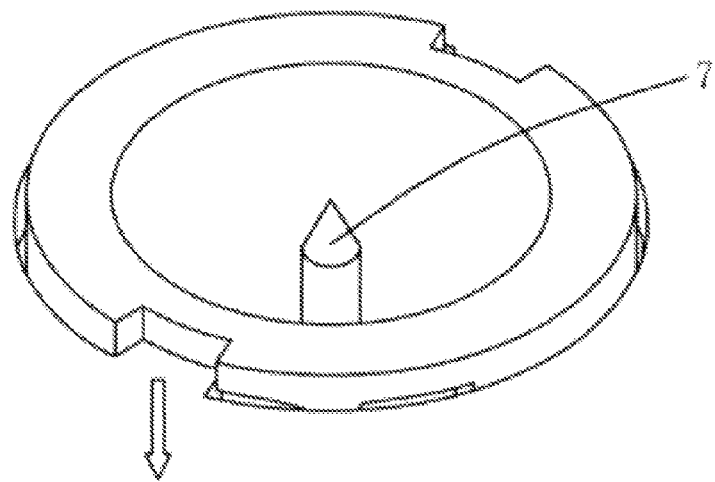

FIG. 1a: shows front view of the dial (100).
FIG. 1b: shows front view of dial pinches (101,102).
FIG. 1c: shows front view of the dial locking profile (106).
FIG. 2a: shows front view of the partially locked dial (100) with compartment (200).
FIG. 2b: shows isometric view of slots (201,202) of the compartment (200).
FIG. 2c: shows the front view of the partially locked locking area 2
FIG. 3a: shows the side view of the slots (201,202) and profile (203,204) of the compartment (200).
FIG. 3b: shows the isometric view of the part in which dial pinches (101,102) matches with slots (201,202) of the compartment (200).
FIG. 4: shows the isometric view of the part in which the dial pinches (101,102) moved 1 mm downwards after matching with the slots of the compartment (200).
FIG. 5a: shows the isometric view of the part in which the dial pinches (101,102) of the dial (100) is over riding the profile (203,204) of the compartment (200).

Figure 5A:
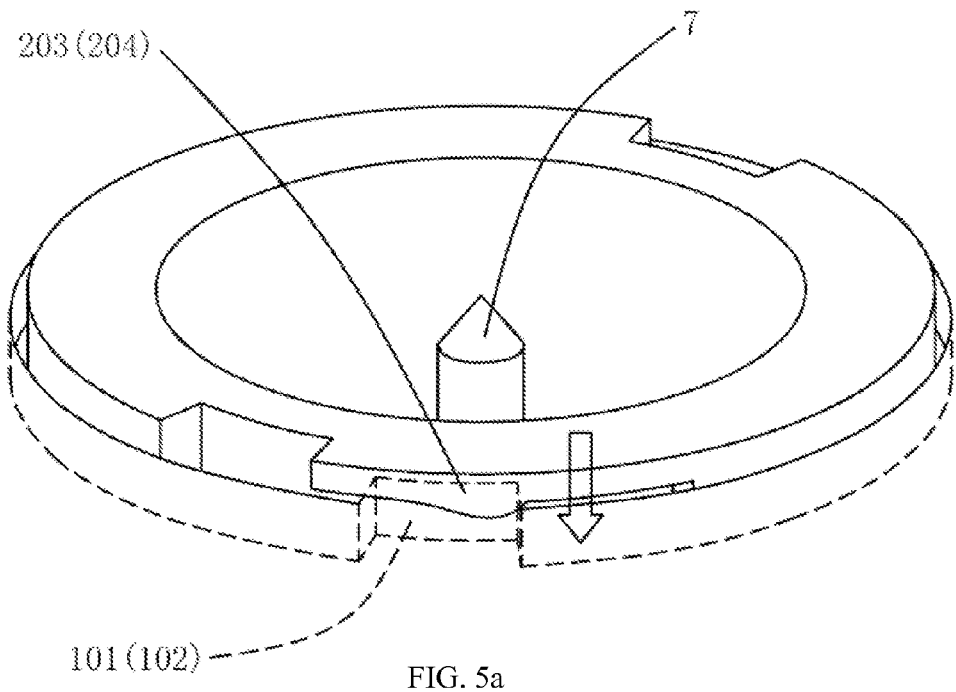
Figure 5B:
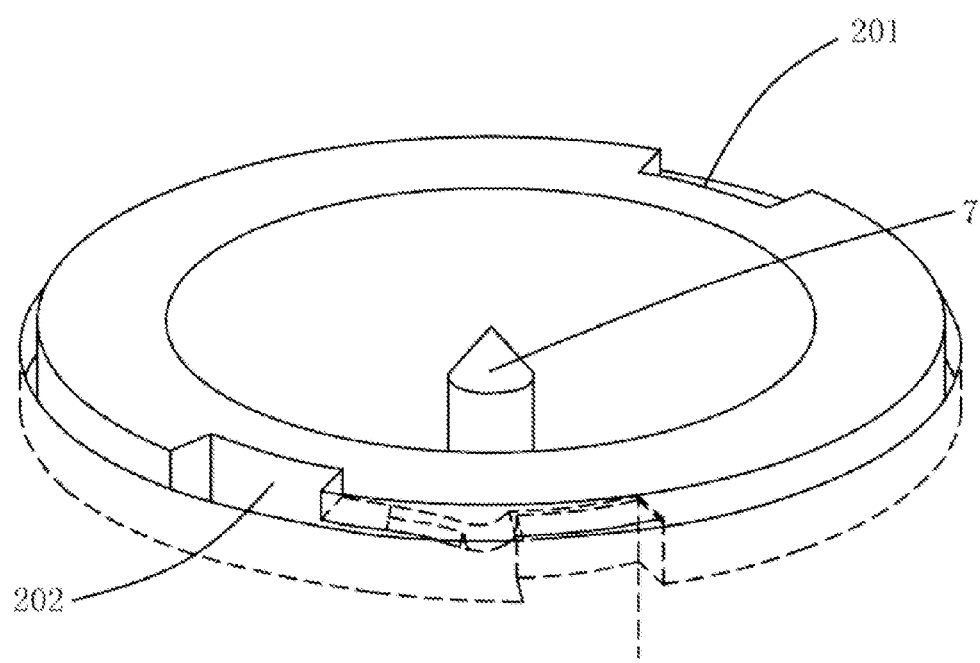

FIG. 5b: shows the isometric view of the part in which the dial pinches (101,102) of the dial (100) is over ridded the profile (203,204) of the compartment (200) and locked.

Figure 6A:
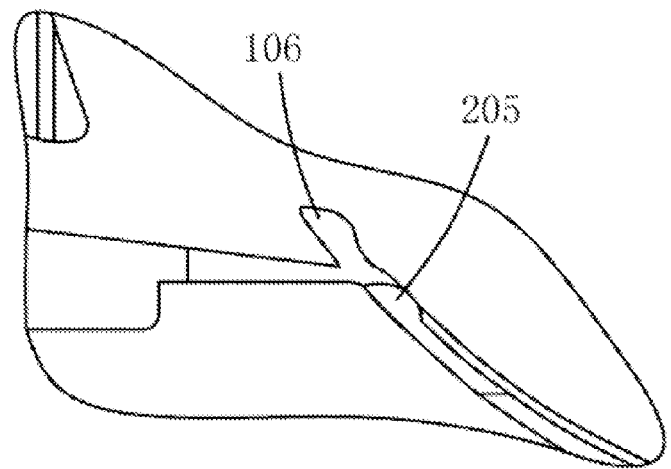

FIG. 6a: shows the front view of the part while the resting profile (205) of the compartment (200) is rubbing along the circumference of the dial (100).

Figure 6B:
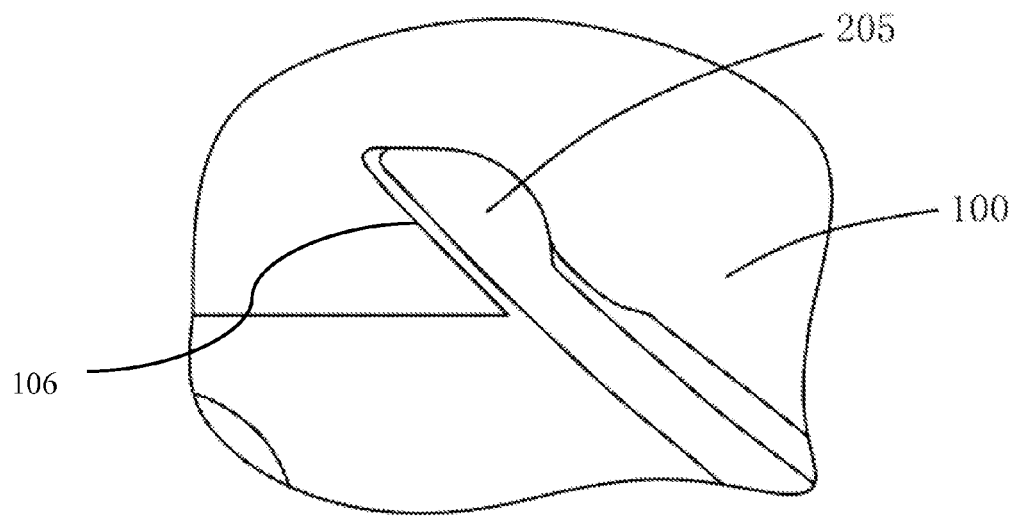

FIG. 6b: shows the front view of the part when dial (100) gets locked after the resting profile (205) of the compartment (200) rests in dial locking profile (106).

Figure 7:
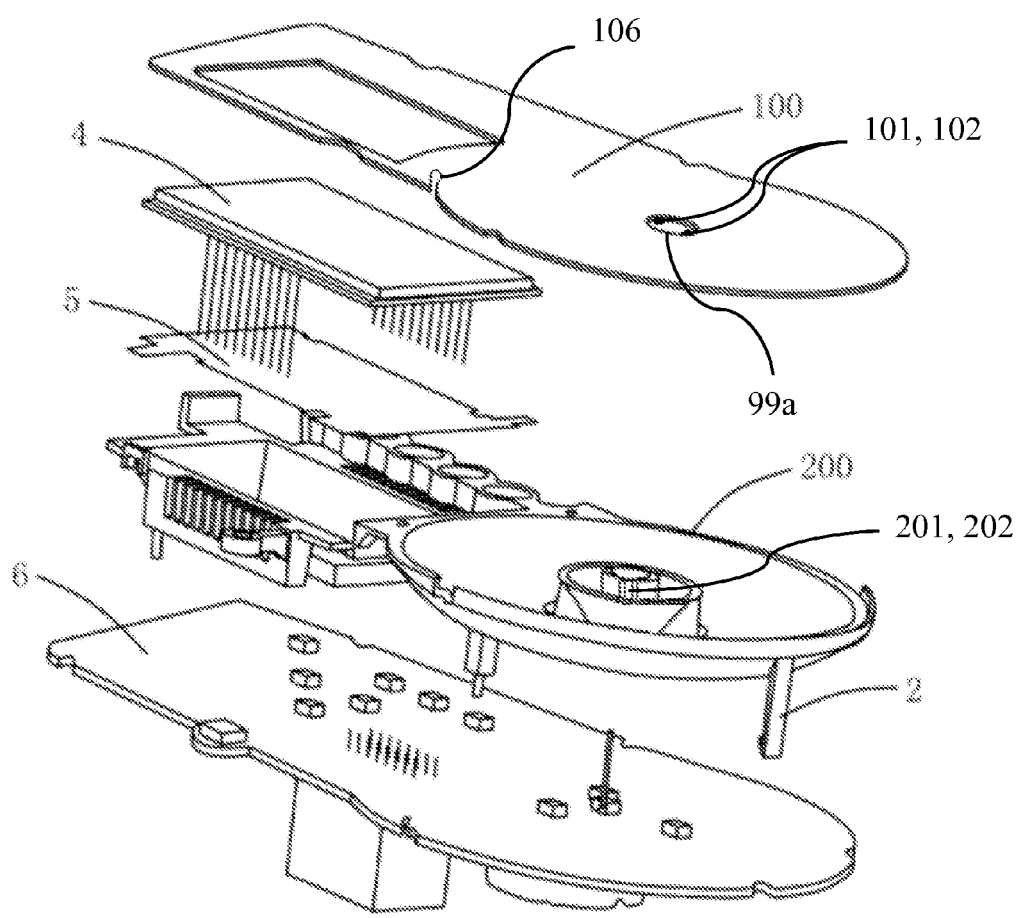

FIG. 7: shows the isometric view of the assembly sequence.

Figure 8:
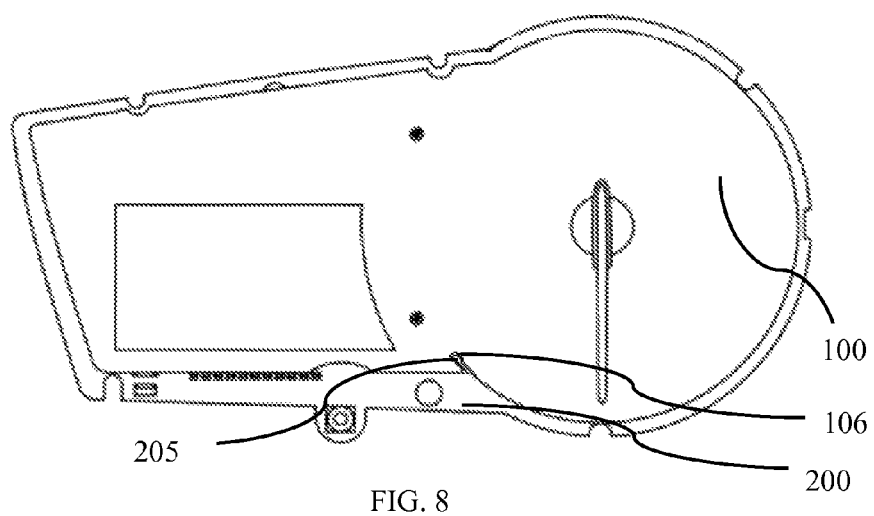

FIG. 8: shows front view of the dial locking system of the prior art in which use of screws (3) for dial locking is seen.

Figure 9:
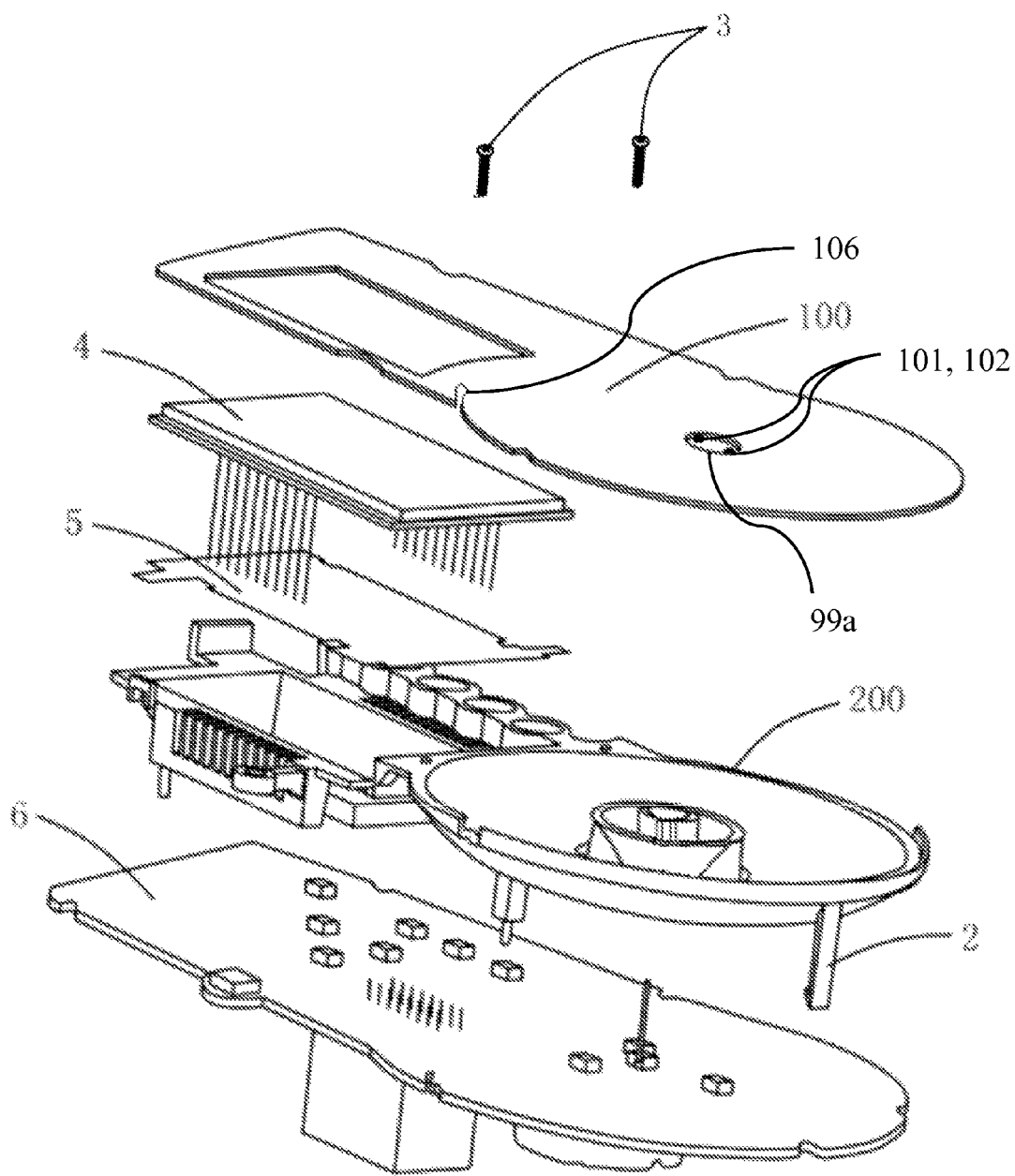

FIG. 9: shows the assembly sequence of the dial locking system of the prior art.

DETAILED DESCRIPTION OF THE INVENTION

The present invention is in relation to a dial locking system comprising a dial (100) having dial pinches (101, 102) at center and dial locking profile (106) at periphery; a compartment (200) having a central axis (7) with slots (201, 202) and resting profile (205) to accommodate the dial locking profile (106) for locking at periphery; and bulged profiles (203, 204) at the slots (201, 202) of the compartment (200) facing downwards for locking at center by the dial pinches (101,102).

In yet another embodiment of the present invention the dial pinches (101, 102) are in align with the slots (201, 202) of the compartment (200) in unlocked stage.

In still another embodiment of the present invention the dial (100) thickness ranges from about 0.5 mm to about 2 mm.

In still another embodiment of the present invention the dial (100) is rotatable preferably in counterclockwise direction about central axis (7) at an angle of about 50 degrees.

The present invention is in relation to a method for locking a dial (100) with a compartment (200), said method comprising steps of: placing the dial (100) on the compartment (200) such that the dial pinches (101,102) are in align with the slots (201,202) of the compartment (200), rotating the dial (100) about the central axis (7) in counter clockwise direction such that the dial pinches (101,102) over rides the profile (203, 204) and resting profile (205) rests in dial locking profile (106) of the dial (100) to lock with the compartment (200).

In still another embodiment of the present invention the resting profile (205) rubs along the circumference of the dial (100) during rotation.

In still another embodiment of the present invention the dial (100) is placed on the compartment and moved downwards by a predetermined depth preferably 1 mm.

In still another embodiment of the present invention the dial (100) is rotated in counterclockwise direction at about 45 degrees.

The present invention is in relation to a method of assembling a dial locking system, said method comprising steps of: mounting light guide/compartment (200) with PCB (6) by using snap fit (2), assembling of LCD (4) through the compartment (200) by soldering with the PCB (6), placing of dial (100) on the compartment (200) and matching dial pinches (101,102) with slots (201,202) provided in the compartment (200), rotating the dial (100) about the central axis (7) in counter clockwise direction such that the dial pinches (101, 102) over rides the profile (203, 204) and resting profile (205) rests in dial locking profile (106) of the dial (100) to lock with the compartment (200).

Advantages of Instant Invention:
1. Less time required to assembly the dial (100) with compartment (200) by using snap fit (2), so it is increasing the production rate.
2. No screws (3) are required to assemble dial with compartment or light guide (200), so the cost of the product will decrease as number of components decrease.
3. The dial (100) assembled with compartment or light guide (200) by using the snap fit, so we can use the same dial (100) and the compartment (200) once again after the disassembly.
4. Very easy to assemble and disassemble the dial without any tool.
5. The Speedo or Tacho graduation offset can be avoided while assembling the dial (100) with compartment or light guide (200) by using snap fit at two places that is at centre and at periphery or circumferentially. This may be useful to avoid the problem during the pointer pressing and calibration of instrument cluster.

The dial locking System contains the following components, which holds the dial (100).
1. Light Guide (or) Compartment. (Refer FIG. 2a)
2. Dial. (Refer FIG. 1a)

The assembly sequence is as follows below.
1. The light guide (or) compartment (200) is assembled with the PCB (6) by using snap fit (2) (Refer FIG. 9).
2. Assembling of LCD (4) (after diffuser sheet (5) placement) through the compartment (or) light guide (200) by soldering with PCB (6) (refer FIG. 9).
3. Placing of dial (100) on the compartment (200) and matching the dial pinches (101,102) with slot (201,202) provided in the compartment (200), and then the dial (100) automatically will go 1 mm in downwards (Refer FIG. 3b and FIG. 4a and FIG. 4b).
4. Rotating the dial (100) about the center axis (7) of Tacho by 50 degrees (refer FIG. 4b), so that dial (100) will get locked by over riding the profile (203,204) given in the compartment (Locking Area-1, refer FIG. 5a and FIG. 5b), and dial (100) is locked with compartment (200) by rubbing the circumference of the dial (100) by resting profile (205) and rests on the dial locking profile (106) of the dial (100) (Locking Area-2, refer FIG. 6a and FIG. 6b) at the same time.

Disadvantages in Existing Method:
1. More time required to assemble the dial (100) with compartment (or) light guide (200) by using screw (3), so it is reducing the production rate.
2. Depending upon the dial size and its vibration range more number of screws are required to assemble the dial with the light guide, so the cost of the product will increase as number of components increases.
3. Since the dial is assembled with light guide by using the self tap screw (3), so we can't use the same screw and the compartment once again if we disassemble the assembly.

The Speedo or Tacho graduation offset noticed while assembling the dial with light guide by using screw. This may produce some problem during the pointer pressing and calibration of instrument cluster.

At Unlocked Stage of the Dial (100) with the Compartment (200).

Figure 4B:
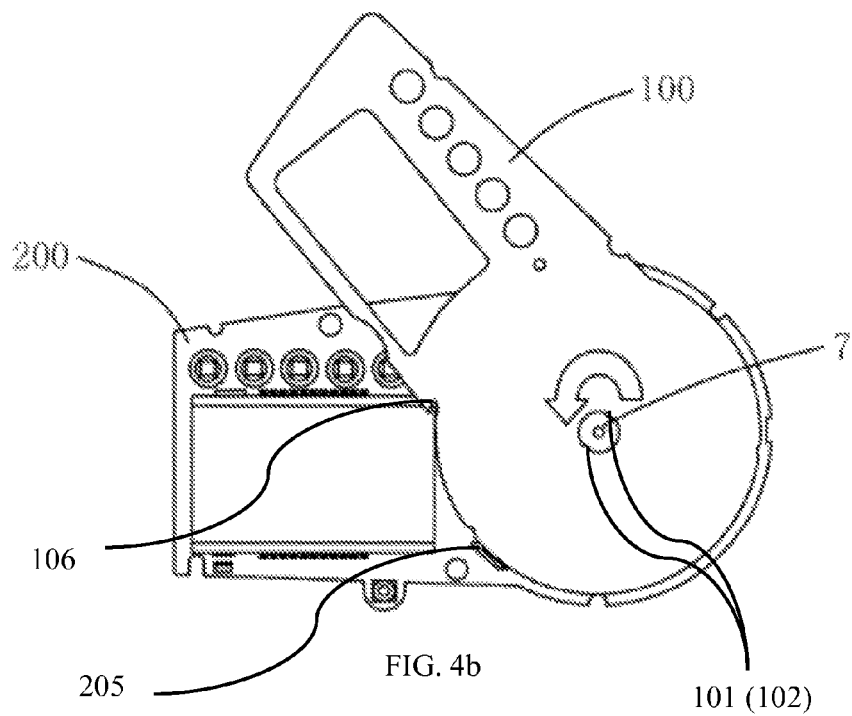

FIG. 4b shows the dial (100) is placed on the compartment (200) matching the dial pinches (101,102) of the dial (100) (refer FIG. 1) with the slots (201,202) (refer FIG. 2b) of the compartment (200) (refer FIG. 2a and FIG. 2b). The dial (100) is moved 1 mm downwards by itself at central axis (7) as indicated by the arrow in FIG. 4a. Referring to FIG. 2c the resting profile (205) of the compartment (200) is aligned with the circumference of the dial (100).

Locked Stage of the Dial (100) with the Compartment (200)

Locking Area 1:

Referring to FIG. 5a and FIG. 5b the dial pinches (101,102) of the dial (100) and the slots (201,202) of the compartment (200) serves as locking area 1. As the dial (100) moved 1 mm downward as shown refer FIG. 4a wherein downward direction is indicated by an arrow, it is rotated in counterclockwise direction for locking. The dial (100) is rotated about the central axis (7) at an angle of about 50 degrees (refer FIG. 4b). During the rotation the dial pinches (101,102) of the dial (100) over rides the semicircular bulged profiles (203,204) facing downwards (refer FIG. 5a, downward direction is indicated by an arrow). The dial (100) gets locked with the compartment (200) when the dial pinches (101,102) complete the overriding of the semicircular bulged profile (203,204) using snap fit as shown in FIG. 5b.

Locking Area 2:

Referring to FIG. 6a and FIG. 6b the dial locking profile (106) of the dial (100) and resting profile (205) of the compartment (200) serves as locking area 2. When the dial (100) is rotated about central axis (7) in counterclockwise direction (refer FIG. 4b) it makes the resting profile (205) of the compartment (200) to rub the circumference of the dial (100) (refer FIG. 6a). The resting profile (205) then rests on the dial locking profile (106) of the dial (100) (refer FIG. 6b) forms snap fit and get locked when the rotation given to dial (100) is about 50 degrees.

What is claimed is:

1. A single step dial locking system of an instrument cluster of a vehicle comprising:
   a dial locking profile (106) provided at a perimeter of a dial (100) having a substantially circular portion (100a) with a hole (99a) provided at central portion (99) of the dial (100);
   two oppositely disposed dial pinches (101, 102) are provided at a perimeter of the hole (99a) such that the dial pinches (101, 102) extends into the hole (99a);
   a compartment (200) having,
     slots (201, 202);
     a resting profile (205) to accommodate the dial locking profile (106) for locking the dial (100) at a perimeter of the compartment (200) using a first snap fit;
     bulged profiles (203, 204) provided adjacent to the slots (201, 202) of the compartment (200) which are facing downwards lock to the dial pinches (101,102) of the dial (100) using at least a second snap fit;
   wherein the slots (201, 202) are arranged in alignment with the dial pinches (101,102) in an unlocked stage of the dial locking system so that the dial is downwards movable a predetermined distance to enable the dial pinches (101,102) to override the bugled profiles (203, 204) during locking to form the second snap fit.

2. The dial locking system as claimed in claim 1, wherein the dial (100) thickness ranges from about 0.5 mm to about 2 mm.

3. The dial locking system as claimed in claim 1, wherein the dial (100) is rotatable in counterclockwise direction about the central axis (7) at an angle of about 50 degrees.

* * * * *